Nov. 17, 1964   J. SANDBAKKEN   3,157,416
ADJUSTABLE STAY FOR TRACTOR OR THE LIKE
Filed Aug. 1, 1962
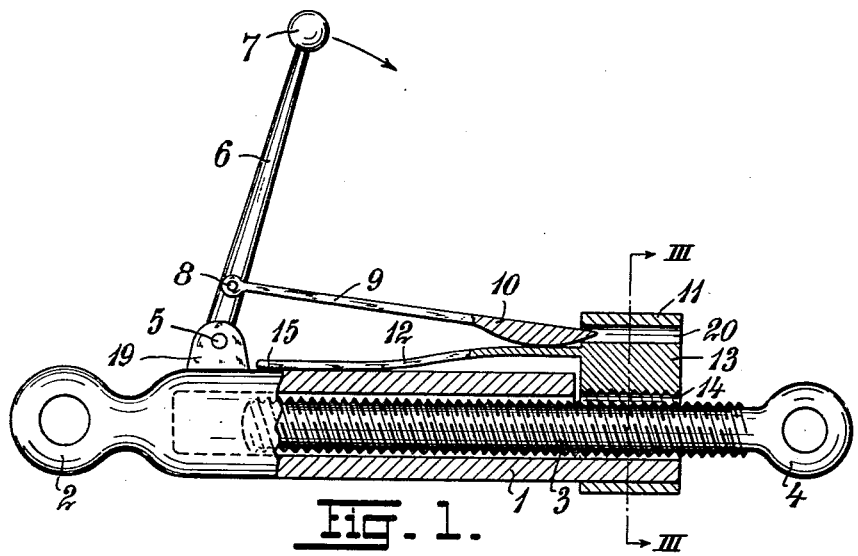
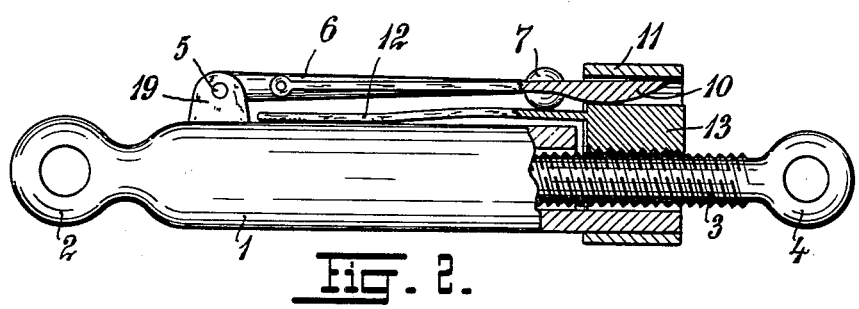
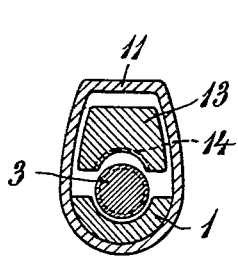 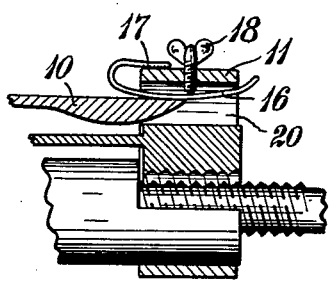
INVENTOR.
Josef Sandbakken
BY Watson, Cole, Grindle & Watson
ATTORNEYS

United States Patent Office 3,157,416
Patented Nov. 17, 1964

3,157,416
ADJUSTABLE STAY FOR TRACTOR OR THE LIKE
Josef Sandbakken, Brumunddal, Norway
Filed Aug. 1, 1962, Ser. No. 214,131
4 Claims. (Cl. 287—58)

The present invention relates to a stay for use with tractors or similar vehicles. The invention has for its object to provide a stay which is easy to adjust to proper length so that time is saved in mounting the lifting device on the tractor. Also a minimum of time will be needed to adjust the stay in side direction, up or down by shortening or lengthening the top stay.

There are previously known various types of adjustable stays, whereby threaded or toothed rods or spindles can be brought into engagement with correspondingly shaped sleeve elements for securing the parts in desired mutual position, thereby to give the stay the required length.

The invention relates to an adjustable stay for tractors or the like, comprising two, relative non-rotatable but axially displaceable elements and locking members to secure the parts in desired mutual position, the one element being tube- or sleeve-like and the second being a rod or spindle element which is axially displaceable in the first element, with a toothed locking device serving to secure said elements in desired mutual position. The new features are present in spindle-shaped element in the form of a threaded spindle and the first element comprising a locking body provided with threads or teeth corresponding to the shape of the second element and secured to the first element by a resilient connection. The arrangement further comprises a wedge mechanism which by means of an arm is secured for rotation with the first element and can be brought against the action of said resilient force to press the locking body into engagement with the second element.

To provide a better understanding of the invention, reference is directed to the following description illustrating an embodiment of the invention in which:

FIG. 1 is a side view partly in section showing a stay device according to the invention, the elements being shown in mutually disengaged position and FIG. 2 is a side view partly in section showing the device according to FIG. 1 with the elements in engaged position.

FIG. 3 is a section taken along the line A—A in FIG. 1.

FIG. 4 is a sectional view showing a part of the device according to FIGURES 1 and 2 somewhat modified.

The arrangement according to FIGS. 1–3 comprises a tubelike or sleeve-shaped element 1 which at one end is provided with an eye 2 for securing the stay to an element. In said tubelike element 1 there is inserted a threaded spindle 3 which in the outer free end has a securing eye 4. The threaded spindle can be freely displaced axially in the interior of the tubelike element 1 when a locking member does not lock the parts mutually to each other.

At the outer surface of the tubelike element 1 lugs 19 are welded for the journaling 5 of a handle having a handgrip in the form of a knob or ball 7. A rod 9 ending in a wedgelike or cam part 10 is rotatably secured to the handle 6.

To the outer surface of the tubelike element 1 is further secured for instance by welding at 15 a solid platespring 12, the free end of which is secured to a locking body or member 13 in the form of a half nut, the threads of which correspond to the threads of the spindle 3. The locking body 13 can move freely into engagement with the spindle 3 by a cut-out opening in the end of the tubelike element 1. The spring 12 is so formed that it tends to bring the locking body 13 out of contact with the threaded spindle 3.

Around the locking body 13 there is secured a solid mounting part which on its upper side has a collar part 11. Between its lower side and the top side of the locking body 13 the wedge 10 can be moved when the arm 6, by means of the handgrip 7, is adjusted as indicated by the arrow in FIG. 1. When the wedge 10 is forced into the space 20, the locking body 13 against the action of the spring 12, is pressed into engagement against the spindle 3. Thereby the threads 14 engage the threads of the spindle 3 and the two elements forming the main parts of the stay device are secured in mutually desired position.

The arm or handle 6, by its pivot 5 and the pivot 8 of the rod 9, is so mounted that the parts are self-locking in the locking position as shown in FIG. 2.

FIG. 4 shows a somewhat modified embodiment. Between the lower side of the collar 11 and the wedge 10 there is arranged a platespring 16, welded at 17 to the top of the part 11 as shown. A screw 18 can be brought into engagement against the top side of the spring 16 and thereby the engagement pressure between the locking body 13 and the spindle 3 may be adjusted. The arrangement according to FIG. 4 is specially adapted to compensate for wear.

In the drawing the spindle 3 and the tubelike element 1 are shown as circular, but one will immediately understand that the invention also could be carried out by elements having another cross sectional form. Further the threads may be replaced by conventional teeth interengaging each other. When threads are shown in the drawing it is for the reason that they are the simplest and cheapest elements to secure the desired interengagement between the parts.

I claim:

1. An adjustable stay for tractors or the like comprising two axially displaceable elements, one of said elements being sleeve-shaped and the second element being a spindle-shaped element axially displaceable in the sleeve-shaped element and the spindle-shaped element being a threaded spindle, a locking member at one end of said sleeve-shaped element, said locking member provided with threads corresponding to the threads on the spindle-shaped element, a resilient means for the locking member secured to the sleeve-shaped element, and biasing said locking member away from said spindle-shaped element, a collar secured on said one end of the sleeve-shaped element and overlying said locking member, a handle pivotally secured on the other end of the sleeve-shaped element, and a wedge pivotally secured on the handle, said wedge extending toward said one end and being movable between said collar and said locking member upon movement of said handle, whereby said wedge presses said locking member against the force of the resilient means and into engagement with the threaded spindle-shaped element by thread engagement of the latter and the locking member.

2. An adjustable stay according to claim 1, in which said locking member has the shape of a half nut.

3. An adjustable stay according to claim 1, in which a spring is provided secured on the collar and extending between the latter and the wedge.

4. An adjustable stay according to claim 1, in which the resilient means is in the form of a spring bar integral at one end with the locking member and bearing with the other end on the sleeve-shaped element.

References Cited in the file of this patent
UNITED STATES PATENTS

| | | |
|---|---|---|
| 1,472,283 | Smith | Oct. 30, 1923 |
| 2,556,348 | Thompson | June 12, 1951 |
| 2,617,660 | Hadlock | Nov. 11, 1952 |
| 2,693,368 | Petron | Nov. 2, 1954 |